P. T. HOUSTON.
INTERNAL COMBUSTION ENGINE.
APPLICATION FILED SEPT. 3, 1919.
1,389,002.
Patented Aug. 30, 1921.
2 SHEETS—SHEET 1.
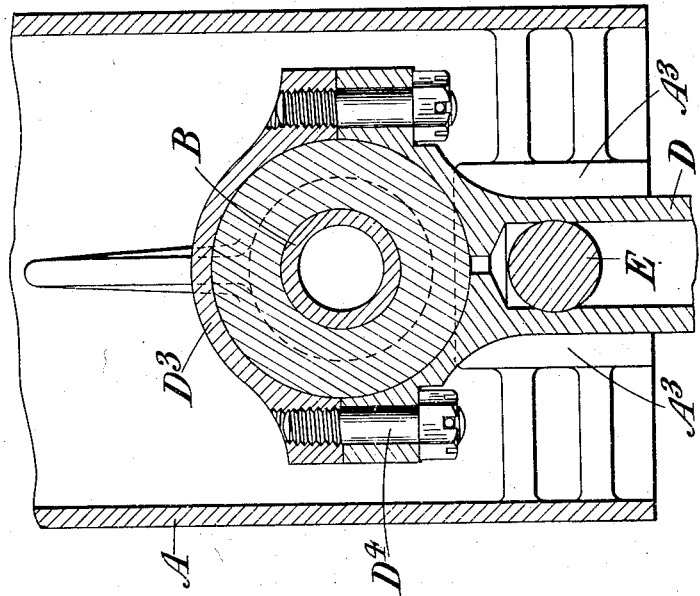
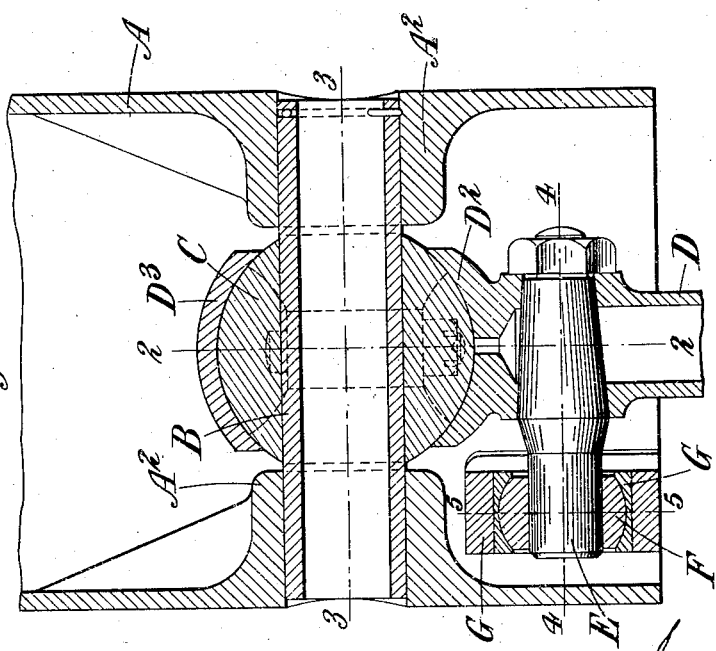

P. T. HOUSTON.
INTERNAL COMBUSTION ENGINE.
APPLICATION FILED SEPT. 3, 1919.
1,389,002.
Patented Aug. 30, 1921.
2 SHEETS—SHEET 2.
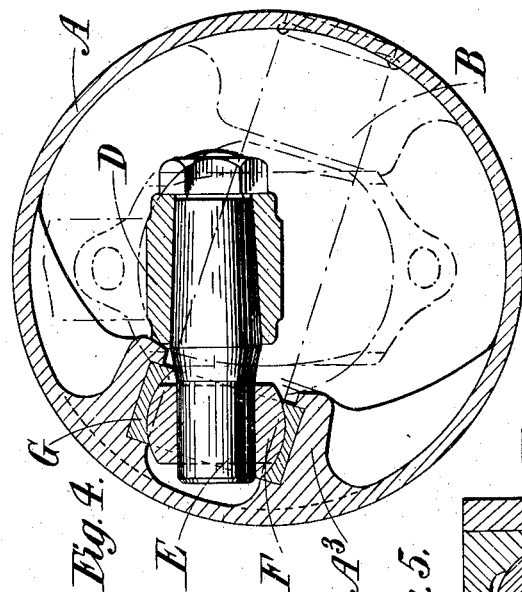
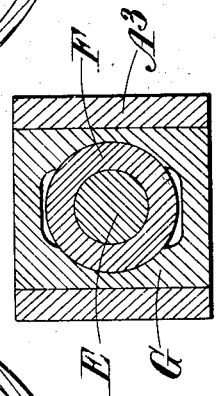
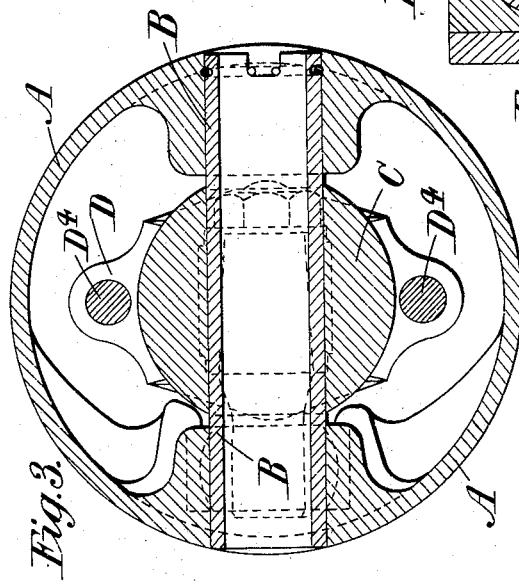

UNITED STATES PATENT OFFICE.

PERCIVAL TURNER HOUSTON, OF LONDON, ENGLAND, ASSIGNOR TO ALPHAERO ENGINES (FOREIGN PATENTS) LIMITED, OF LONDON, ENGLAND.

INTERNAL-COMBUSTION ENGINE.

1,389,002.   Specification of Letters Patent.   Patented Aug. 30, 1921.

Application filed September 3, 1919. Serial No. 321,379.

*To all whom it may concern:*

Be it known that I, PERCIVAL TURNER HOUSTON, a subject of the King of England, residing at London, England, have invented certain new and useful Improvements in Internal-Combustion Engines, of which the following is a specification.

This invention relates to improvements upon the internal combustion engine described in my prior application Number 285087, filed 25th March, 1919, and it has for its object to provide a piston and connecting rod mechanism of the kind described therein in which the piston, gudgeon pin and other parts can be more simply constructed.

According to this invention, there is combined with an ordinary gudgeon pin fitted in the usual manner to the piston, a partial ball mounted thereon which is engaged by a parti-spherical small end on the connecting rod. For example, the latter may be formed with a detachable cap, the interior of which, with the corresponding face of the rod is formed parti-spherical to grip and work upon the ball.

The connecting rod is provided with the extension referred to in the prior application which engages the piston skirt and effects its twisting as before.

In the accompanying drawings,

Figure 1 is a central vertical section showing part of a piston and connecting rod.

Fig. 2 is a similar section on the line 2—2 of Fig. 1.

Fig. 3 is a transverse section on the line 3—3 of Fig. 1, and

Fig. 4 is a transverse section on the line 4—4 of Fig. 1, with the parts in a different position, and Fig. 5 is a detail section on the line 5—5 of Fig. 1.

Like letters indicate like parts throughout the drawings.

The piston A is formed with lugs $A^2$ for the reception of a gudgeon pin B of conventional form, upon which is mounted the partial ball C, which is formed in one piece and threaded upon the gudgeon pin. This ball is engaged by the small end of the connecting rod D, which is provided with a parti-spherical seating at $D^2$ and a cap $D^3$ secured by the screws $D^4$. The cap has also a parti-spherical seating, so that the ball is inclosed in a working bearing, but it, and the piston A, can rock in any direction in relation to the connecting rod D.

The latter is provided with a projection E, upon which floats a partial ball F lying in a parti-spherical bearing in a slide G which can move vertically in relation to the piston, in lugs $A^3$ thereon.

Thus as the connecting rod rocks upon the ball C in a plane at right angles to the axis of the gudgeon pin B, the piston also twists, as shown in Fig. 4 and as fully described in the prior specification No. 285087.

It will be seen that in this construction the piston is of simple form, the ball C is in one piece and a simple form of gudgeon pin can be used. The construction therefore is simple and cheap to manufacture.

What I claim as my invention and desire to secure by Letters Patent is:—

1. In an internal combustion engine, the combination of a piston having alined gudgeon pin bosses, a gudgeon pin removably mounted in said bosses, a parti-spherical surface on said gudgeon pin, a connecting rod bearing upon said parti-spherical surface, and a projection upon said connecting rod engaging the wall of said piston, substantially as set forth.

2. In an internal combustion engine, the combination of a piston, a gudgeon pin mounted in said piston, a parti-spherical surface on said gudgeon pin, a connecting rod bearing upon said parti-spherical surface, and a projection upon said connecting rod, a partial ball floating on said projection, and a slide movable vertically in said piston and engaged by said partial ball, substantially as set forth.

3. In an internal combustion engine, the combination of a piston, lugs on said piston, a gudgeon pin mounted in said lugs, a partial ball carried upon said gudgeon pin, a connecting rod having a parti-spherical surface engaging said partial ball, a parti-spherical cap attached to said rod and engaging said partial ball, a pin carried by and projecting from said connecting rod, a partial ball floating on said pin, a slide movable vertically in said piston and a parti-spherical surface on said guide engaging said floating partial ball, substantially as set forth.

In testimony whereof I have signed my name to this specification in the presence of two subscribing witnesses.

PERCIVAL TURNER HOUSTON.

Witnesses:
 ERNEST MASON,
 E. C. WALKER.